US008970395B2

(12) United States Patent
Nilsson et al.

(10) Patent No.: US 8,970,395 B2
(45) Date of Patent: Mar. 3, 2015

(54) BATTERY-POWERED LEVEL GAUGE SYSTEM ADAPTED FOR WIRELESS COMMUNICATION

(75) Inventors: Leif Nilsson, Linköping (SE); Håkan Delin, Linköping (SE); Håkan Nyberg, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 351 days.

(21) Appl. No.: 13/537,513

(22) Filed: Jun. 29, 2012

(65) Prior Publication Data
US 2014/0002274 A1 Jan. 2, 2014

(51) Int. Cl.
*G08B 23/00* (2006.01)
(52) U.S. Cl.
USPC ................................. 340/870.02; 340/870.01
(58) Field of Classification Search
CPC ....... G01D 4/002; G01D 4/004; G01D 4/006; G01F 15/063; G08C 17/02
USPC ..................................................... 340/870.02
See application file for complete search history.

(56) References Cited

U.S. PATENT DOCUMENTS

| 5,111,201 A | 5/1992 | Matsumura et al. |
|---|---|---|
| 2003/0028336 A1* | 2/2003 | Masar et al. ..................... 702/55 |
| 2007/0103324 A1 | 5/2007 | Kosuge et al. |
| 2008/0278145 A1* | 11/2008 | Wenger ......................... 324/157 |
| 2009/0174570 A1* | 7/2009 | Hagg ....................... 340/870.31 |

* cited by examiner

*Primary Examiner* — Kerri McNally
(74) *Attorney, Agent, or Firm* — Westman, Champlin & Koehler, P.A.

(57) ABSTRACT

The present invention relates to a method comprising providing an activation signal from a wireless communication unit to a measurement unit to switch the measurement unit from its inactive state to its active state; providing a measurement request signal to the measurement unit to request measurement of a filling level of a product in a tank; and thereafter switching the wireless communication unit from its active state to its inactive state. The measurement unit measures the filling level and provides a measurement ready signal to the wireless communication unit; the wireless communication unit is switched from its inactive state to its active state in response to the measurement ready signal received from the measurement unit; the wireless communication unit retrieves the value indicative of the filling level from the measurement unit; and wirelessly transmits the value indicative of the filling level to the remote device.

15 Claims, 4 Drawing Sheets

BATTERY-POWERED LEVEL GAUGE SYSTEM ADAPTED FOR WIRELESS COMMUNICATION

FIELD OF THE INVENTION

The present invention relates to a battery-powered level gauge system for providing a value indicative of a filling level of a product contained in a tank to a remote device using wireless communication and to a method of providing a value indicative of a filling level of a product contained in a tank to a remote device using such a battery-powered level gauge system.

TECHNICAL BACKGROUND

Level gauge devices, such as radar level gauges, are widely used in various applications, such as in process industry or for monitoring tanks for storing products. Generally, the level gauge systems are provided with electrical energy for operation through wires and communicate with a remote device, such as a host system, through wires. The wiring for an installation may be rather complex and costly, and flexibility may be limited. Therefore, field devices that do not require any wiring at all have become increasingly popular. Such a wireless level gauge system is configured to communicate with a remote device using a wireless communication protocol, for example wireless HART, and comprises a local energy store, such as a battery, for providing electrical energy for operation of the wireless level gauge system.

For wireless field devices in general, and wireless level gauge systems in particular it is, however, important to keep the average energy consumption low to avoid frequent maintenance for replacing batteries etc. This is particularly the case for radar level gauges that perform relatively complex measurement tasks. A radar level gauge propagates an electromagnetic transmit signal towards the surface of a product contained in a tank, receives an electromagnetic reflected signal being a reflection of the transmit signal at the surface of the product, and determines the filling level based on the time-of-flight of the electromagnetic transmit signal from the radar level gauge to the surface and back.

U.S. 2008/0278145 discloses a process measurement instrument adapted for wireless communication, which comprises a measurement unit, a wireless communication unit, arbitration logic and a common memory. The measurement unit and the wireless communication unit can independently write to and read from the common memory. In operation, the measurement unit and the wireless communication unit share information via the common memory, and the arbitration logic ensures that the wireless communication unit and the measurement unit are not active at the same time.

Although the solution according to U.S. 2008/0278145 provides for a low average energy consumption of a field device for wireless communication, it may be desirable to provide an alternative solution that may be simpler to implement and/or even more cost-efficient, at least for some applications.

SUMMARY

In view of the above, a general object of the present invention is to provide for simpler and/or more cost-efficient operation of a battery-powered level gauge system adapted for wireless communication with a remote device.

According to a first aspect of the present invention, it is therefore provided a method of providing a value indicative of a filling level of a product contained in a tank to a remote device using a battery-powered level gauge system comprising a measurement unit and a wireless communication unit, each being controllable between an active state and an inactive state with a lower power consumption than the active state, the method comprising the steps of providing an activation signal from the wireless communication unit to the measurement unit to switch the measurement unit from its inactive state to its active state; providing a measurement request signal from the wireless communication unit to the measurement unit to request measurement of the filling level; switching the wireless communication unit from its active state to its inactive state after having provided the measurement request signal to the measurement unit; measuring the filling level by the measurement unit; providing, after having measured the filling level, a measurement ready signal from the measurement unit to the wireless communication unit; switching the wireless communication unit from its inactive state to its active state in response to the measurement ready signal received from the measurement unit at the wireless communication unit; retrieving the value indicative of the filling level from the measurement unit to the wireless communication unit; and wirelessly transmitting the value indicative of the filling level to the remote device.

The remote device with which the battery-powered level gauge system communicates may, for example, be a wireless host of a system including several different field devices.

The present invention is based on the realization that energy-efficient operation of a battery-powered level gauge system can be achieved by providing a wireless communication unit and a measurement unit that function separately from each other and operating the battery-powered level gauge system according to a special scheme where the wireless communication unit handles the scheduling of the measurement unit. According to embodiments of the inventive scheme, the wireless communication unit orders the measurement unit to briefly wake up, provides the measurement unit with a measurement request signal and then puts itself to sleep until it receives a measurement ready signal from the measurement unit. The measurement ready signal wakes the wireless communication unit, which retrieves the measurement value from the measurement unit and then puts the measurement unit back to sleep. Accordingly, the wireless communication unit and the measurement unit are simultaneously active during short periods only, and only standard circuitry is required. For example, no dual port memory is necessary, since the wireless communication unit briefly wakes up the measurement unit to retrieve the value indicative of the filling level to be wirelessly transmitted to the remote device.

Through various embodiments of the present invention, the wireless communication unit can schedule the level measurement events to fit with the wireless communication events, so that the level measurement value that is wirelessly communicated to the remote device is a recently determined value. Furthermore, the divided architecture allows for separate optimizations of the wireless communication unit and the measurement unit, so that the wireless communication unit may, for example, be optimized in respect of energy efficiency, while the measurement unit may, for example, be optimized in respect of performance. Over time, this can provide for a more energy-efficient operation and longer battery life, since filling level measurement events can take place relatively quickly and the measurement unit be shut down by the wireless communication device after the wireless communication device has retrieved the filling level measurement value from the measurement unit.

Advantageously, the measurement ready signal may be communicated using a first communication channel and the value indicative of the filling level may be retrieved using a second communication channel different from the first communication channel. For example, the first communication channel may be a dedicated discrete signal path, while the second communication channel may be a communication interface, such as a serial data interface or a parallel data interface. The first communication channel may be a one-way channel, while the second communication channel may be bidirectional.

According to various embodiments of the present invention, the step of wirelessly transmitting the value indicative of the filling level to the remote device may take place during a time slot for wireless communication, consecutive time slots for wireless communication being separated by an interval time, and the wireless communication unit may control the measurement unit to measure the filling level during a measurement time period being in a latter half of the interval time.

Hereby, the filling level measurement will be completed before the next time slot for wireless communication, while at the same time being performed sufficiently late in the interval time to allow provision of a "fresh" filling level measurement value to the remote device. This may be of particular importance when the filling level fluctuates. Therefore, the wireless communication unit may control the measurement unit such that the measurement time period is based on a result of a previous filling level measurement value. Such a dynamic control of the measurement time period may be determined by the battery-powered level gauge system or by the remote device. Controlling the measurement time period to occur late in the interval time may also be of particular importance in cases when the update rate is rather low. For some applications and/or under some operating conditions, the interval time may be as long as 10 minutes or more.

It may thus be beneficial to provide a filling level from the final part of the interval between time slots for wireless communication. Through various embodiments of the present invention, this can be achieved without keeping any of the wireless communication unit and the measurement unit active for a longer time.

For various applications, it may be beneficial to schedule the filling level measurement even later in the interval time, such as in the final tenth of the interval time.

According to various embodiments, the wireless communication unit may provide the activation signal and the measurement request signal to the measurement unit during the latter half of the interval time.

Alternatively, or additionally, the timing of the measurement time period may be encoded by the measurement request signal.

After having retrieved the value indicative of the filling level from the measurement unit, the wireless communication unit may advantageously provide a deactivation signal to the measurement unit to switch the measurement unit from its active state to its inactive state. This will ensure that the measurement unit is not active during wireless communication, and the total energy consumption of the battery-powered level gauge system will be kept down.

According to various embodiments of the present invention, the method may, after the step of providing the measurement request signal from the wireless communication unit to the measurement unit, further comprise the step of controlling a timer to switch the wireless communication unit from its inactive state to its active state after a predefined time-out period being longer than an expected time period until receiving the measurement ready signal from the measurement unit.

This provides for a simple and efficient way of handling a possible case that the measurement ready signal is not received when expected. if the wireless communication unit is switched from its inactive state to its active state by the preset time-out rather than by the measurement ready signal, the wireless communication unit may proceed to find the reason for the measurement ready signal being late. If it is due to particularly difficult measurement conditions, the wireless communication unit may allow more time until the measurement result is retrieved from the measurement unit. In case the measurement unit appears to be faulty, this can be communicated by the wireless communication device to the remote device to allow for maintenance of the battery-powered level gauge system.

The battery-powered level gauge system may advantageously be a radar level gauge system. In such embodiments, the filling level is measured by transmitting an electromagnetic transmit signal towards a surface of the product contained in the tank, receiving an electromagnetic reflection signal resulting from reflection of the electromagnetic transmit signal at the surface, and determining the filling level based on the electromagnetic reflection signal. The electromagnetic transmit signal transmitted towards the surface of the product inside the tank may be a pulse train or a substantially continuous signal. In the former case, the pulses may either be DC-pulses or a modulated carrier signal. Furthermore, depending on the situation, the time-of-flight of the electromagnetic signal to the surface and back may be determined using different methods, such as so-called TDR (time domain reflectometry) or FMCW (frequency modulated continuous wave).

According to a second aspect of the present invention, it is provided a battery-powered level gauge system for providing a value indicative of a filling level of a product contained in a tank to a remote device using wireless communication, the level gauge system comprising: a measurement unit for measuring the filling level, the measurement unit being controllable between an active state and an inactive state with a lower power consumption than the active state; a wireless communication unit connected to the measurement unit for retrieving the value indicative of the filling level from the measurement unit and wirelessly transmitting the value indicative of the filling level to the remote device, the wireless communication unit being controllable between an active state and an inactive state with a lower power consumption than the active state; and a local energy store connected to the measurement unit and the wireless communication unit for supplying energy sufficient for operation of the measurement unit and the wireless communication unit, wherein the measurement unit is configured to: measure the filling level in response to a measurement request signal from the wireless communication unit; and provide, after having measured the filling level, a measurement ready signal to the wireless communication unit; and wherein the wireless communication unit is configured to: provide an activation signal to the measurement unit to switch the measurement unit from its inactive state to its active state; provide a measurement request signal to the measurement unit to request measurement of the filling level; switch the wireless communication unit from its active state to its inactive state after having provided the measurement request signal to the measurement unit; switch the wireless communication unit from its inactive state to its active state in response to a measurement ready signal received from the measurement unit; retrieve the value indicative of the filling level from the measurement unit; and wirelessly transmit the value indicative of the filling level to the remote device.

It should be noted that the either or both of the measurement unit and the wireless communication unit may comprise processing circuitry implemented as one or several microprocessors comprised in the battery-powered level gauge system.

The local energy source may advantageously, for example, comprise a battery and/or a super capacitor.

In embodiments where the filling level is determined using the time-of-flight of electromagnetic signals, the propagation device may be any device capable of propagating electromagnetic signals, including transmission line probes, waveguides and various types of radiating antennas such as horn antennas, parabolic antennas, rod antennas, array antennas etc.

In various embodiments of the battery-powered level gauge system according to the present invention, the wireless communication unit may comprise a timer, and the wireless communication unit may further be configured to control the timer to switch the wireless communication unit from its inactive state to its active state after a predefined time-out period being longer than an expected time period until receiving the measurement ready signal from the measurement unit. The timer may advantageously be a part of the wireless communication unit.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

In the present detailed description, various embodiments of a method and a system according to the present invention are mainly discussed with reference to a battery-powered radar level gauge system having a free propagating antenna such as a horn antenna for determination of a filling level of a product contained in a tank. It should be noted that this by no means limits the scope of the present invention which is equally applicable to other types of battery-powered level gauge systems, including level gauge systems that determine the filling level of a product in a tank using ultrasound signals or capacitive measurement techniques. Furthermore, for the case of battery-powered radar level gauge systems, other propagation devices may be used, including other free propagating antennas such as a rod antenna, a patch antenna, a fixed or movable parabolic antenna or a conical antenna, and wave guides such as a still pipe, a transmission line or a probe such as a single line probe (including a so-called Goubau probe), a twin line probe or a coaxial probe.

Figure 1:
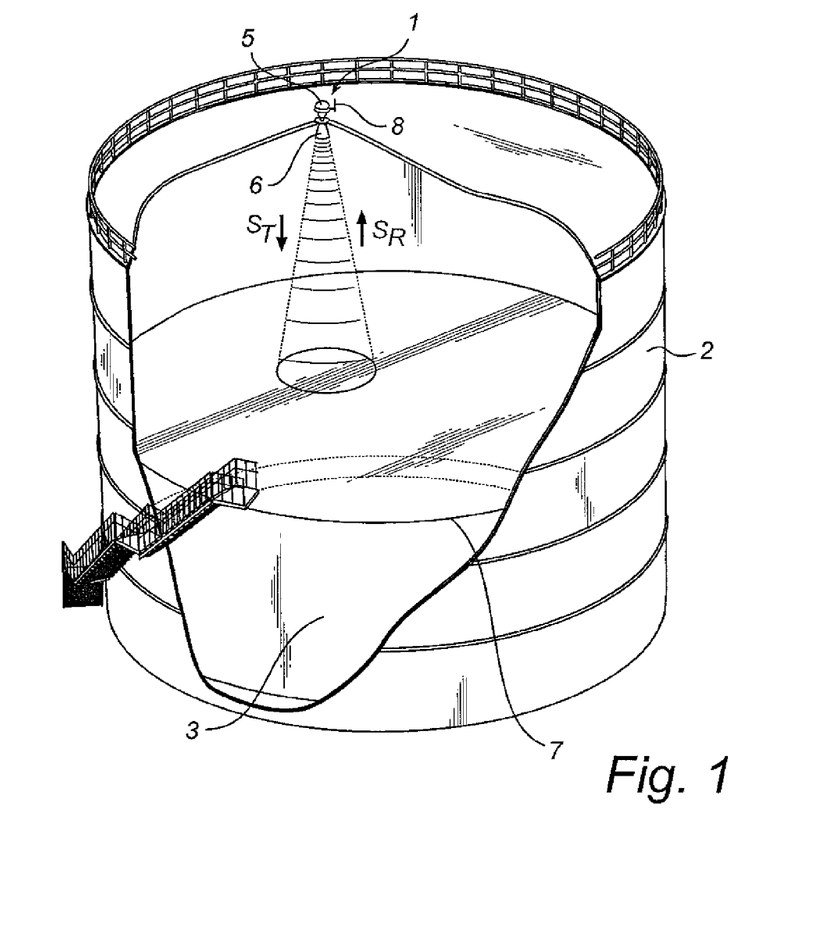
FIG. 1 schematically illustrates a level gauge system according to an embodiment of the present invention arranged to determine the filling level of a tank.

FIG. 1 schematically illustrates a level gauge system 1 arranged on top of a tank 2 for determining the filling level of a product 3 contained in the tank 2 using microwaves. The level gauge system 1 is therefore in the following referred to as a radar level gauge system or an RLG-system.

The radar level gauge system 1 comprises a measurement unit 5, a propagation device, here in the form of a horn antenna 6 for propagating microwaves towards a surface 7 of the product 3 contained in the tank 2, and a communication antenna 8 for allowing wireless communication with a remote device.

When measuring the filling level of the product 3 contained in the tank 2, the radar level gauge system 1 transmits an electromagnetic transmission signal $S_T$ by the antenna 6 towards the surface 7 of the product 3, where the signal is reflected as a surface echo signal $S_R$. The distance between a reference position at the top of the tank 2 and the surface 7 of the product 3 is then determined based on the time-of-flight of the surface echo signal $S_R$. From this distance and known dimensions of the tank 2, the filling level can be deduced.

It should be noted that, although a tank 2 containing a single product 3 is discussed herein, the distance to any material interface present in the tank 2 may be measured in a similar manner.

Figure 2:
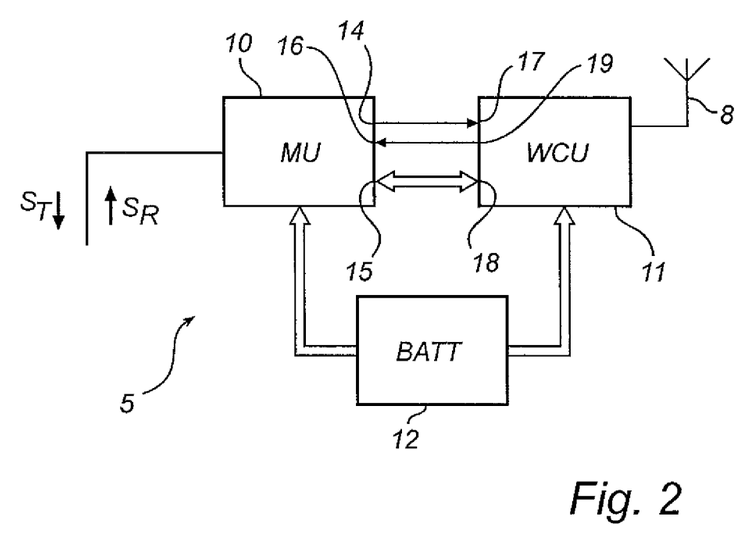
FIG. 2 is a schematic block diagram of level gauge system in FIG. 1.

With reference to FIG. 2, which is a block diagram of the measurement unit 5 in FIG. 1, the measurement unit 5 of the level gauge system 1 in FIG. 1 comprises a measurement unit (MU) 10, a wireless communication unit (WCU) 11 and a battery 12. The wireless communication unit 11 may advantageously be compliant with WirelessHART (IEC 62591).

As is schematically indicated in FIG. 2, the measurement unit 10 comprises a first output 14, a second output 15, and a first input 16. The first output 14 is connected to a first input 17 of the wireless communication unit 11 through a first dedicated discreet line, the second output 15 is connected to a second input 18 of the wireless communication unit 11, and the first input 16 is connected to a first output 19 of the wireless communication unit 11 through a second dedicated discreet line. The second output 15 of the measurement unit 10 and the second input 18 of the wireless communication unit 11 may be configured to handle bidirectional data communication according to a serial or a parallel communication protocol to allow exchange of data between the measurement unit 10 and the wireless communication unit 11. The communication between the measurement unit 10 and the wireless communication unit 11 using the different inputs/outputs will be described in more detail below in connection with a description of an example embodiment of the method according to the present invention.

The operation of the battery-powered level gauge system 1 will now be described with reference to the block diagram in FIG. 2, the flow-charts in FIG. 3 and the timing diagram in FIG. 4.

Figure 3:
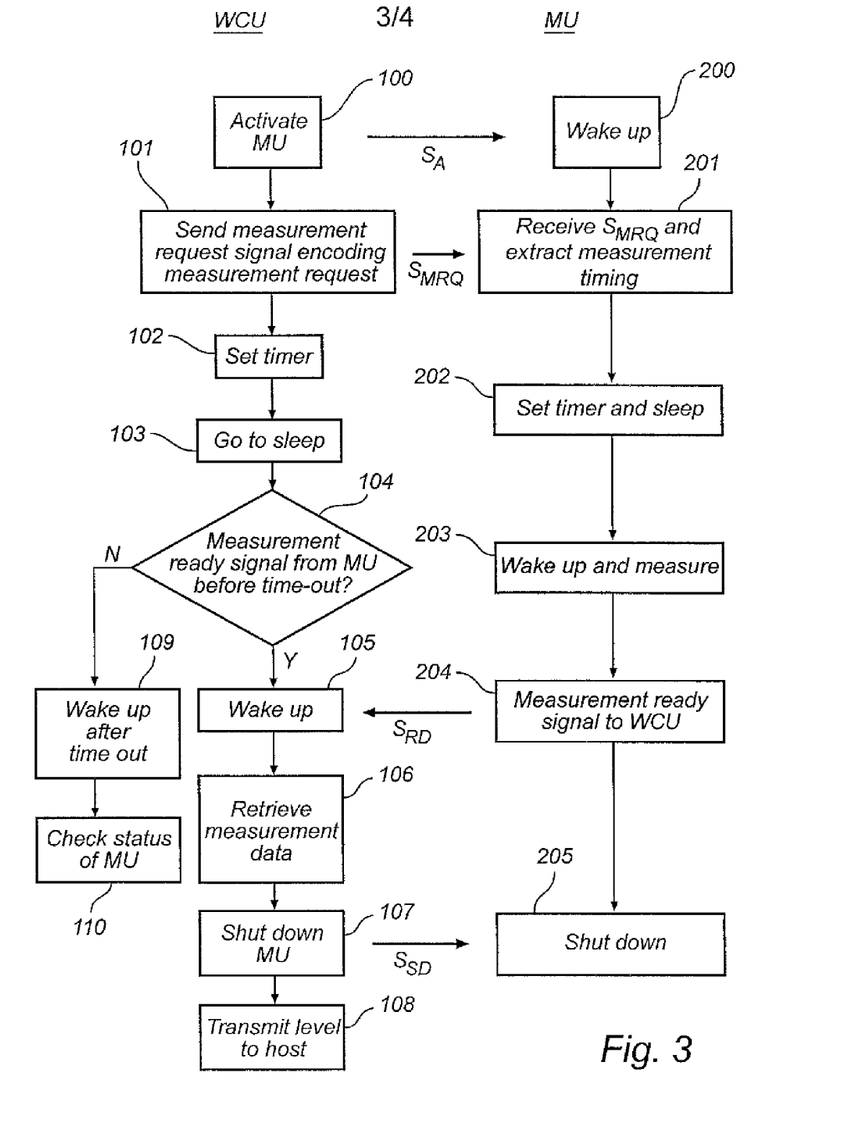
FIG. 3 is a flow chart outlining a method according to an embodiment of the invention.

FIG. 3 schematically shows the steps performed by the wireless communication unit (WCU) 11 to the left and the steps performed by the measurement unit (MU) 10 to the right. The interactions between the WCU 11 and the MU 10 are indicated using arrows between the two flow-charts.

In the following, the steps performed will be described in chronological order, which means that the description will alternate between the two flow-charts. It will, however, be clearly indicated which unit performs the respective ones of the different method steps discussed. Furthermore, the method steps performed by the WCU 11 will be numbered starting from 100, while the method steps performed by the MU 10 will be numbered starting from 200.

In a first step 100, the WCU 11 activates the MU 10 by sending an activation signal $S_A$ to the MU 10. The activation signal $S_A$ is output from the first output 19 of the WCU and directly routed to the first input 16 of the MU 10, and the MU is configured to transition from its inactive state, which may be complete or almost complete shut-down, to its active state in response to a signal received on the first input 16.

Accordingly, the MU 10 wakes up/is powered up in a first step 200 in response to receiving the activation signal $S_A$ on the first input 16.

The next step 101 for the WCU 11 is to send a measurement request signal $S_{MRQ}$ to the MU 10. The measurement request signal $S_{MRQ}$ is sent from the second output (I/O) 18 of the WCU to the second input (I/O) 15 of the MU 10 and encodes a measurement request message. The measurement request message may include various measurement parameters, including a measurement timing parameter $t_M$, which may indicate the time until the MU 10 should start the procedure for measuring the filling level. After having sent the measurement request signal $S_{MRQ}$ to the MU 10, the WCU 11 proceeds to set an internal timer in step 102. Subsequently, the WCU 11 switches itself to its inactive state in step 103. The internal timer is set in step 102 to ensure that the WCU is switched back to its active state in case the MU 10 takes longer than expected to finish the filling level measurement or does not provide a measurement value at all. This will be described in more detail further below.

Turning again to the steps performed by the MU 10 to the right in FIG. 3, the MU 10 receives, in step 201, the measurement request signal $S_{MRQ}$ through its second input (I/O) 15 and extracts the measurement parameters, including the measurement timing $t_M$. In the case that the measurement timing indicates that the filling level measurement should not take place immediately, the MU 10 sets an internal timer based on the measurement timing $t_M$ and transitions to its inactive state in the subsequent step 202.

After the time indicated by the measurement timing $t_M$, the MU 10 wakes up and performs the filling level measurement in step 203. When the measurement has been carried out, and the MU 10 has determined a value indicative of the filling level, the MU 10 sends a measurement ready signal $S_{RD}$ from its first output 14 to the first input 17 of the WCU 11 in step 204.

Turning again to the flow-chart related to the WCU 11 to the left of FIG. 3, different actions are taken depending on how the WCU is activated. If, with reference to step 104, the measurement ready signal SRD from the MU 10 is received before the internal timer provides an internal wake-up signal, the WCU is, in step 105, switched from its inactive state to its active state as a result of receiving the measurement ready signal $S_{RD}$ from the MU 10. The WCU will then proceed to step 106 and retrieve measurement data from the MU 10 using the serial or parallel data interface. After having retrieved the measurement data, the WCU 11 sends a shut-down signal $S_{SD}$ to the MU 10 in step 107 and transmits a value indicative of the filling level to the remote device, for example the host, in step 108. The MU 10 shuts down in step 205 in response to the shut-down signal $S_S D$.

Should the time-out set in step 102 expire before the WCU 11 receives the measurement ready signal $S_{RD}$ from the MU 10, then the WCU 11 is, in step 109 instead switched from its inactive state to its active state by a signal from the internal timer. Thereafter, the WCU 11 proceeds to the next step 110 to take appropriate action, such as check the status of the MU 10 to determine the reason for the late or absent measurement ready signal $S_{RD}$.

Figure 4A:
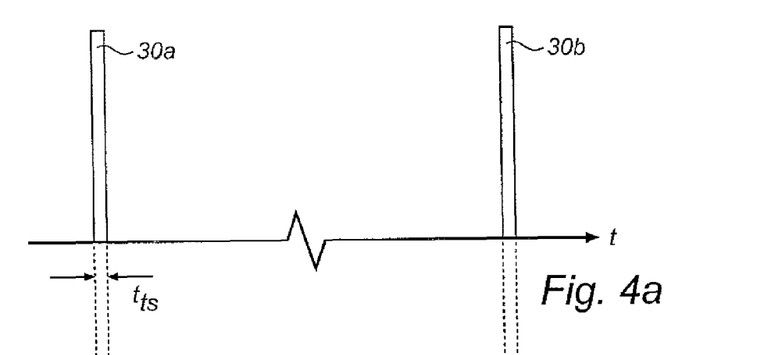
FIG. 4 schematically illustrates an example of a driving scheme the intermittent operation of the level gauge system in FIG. 1.
Figure 4B:
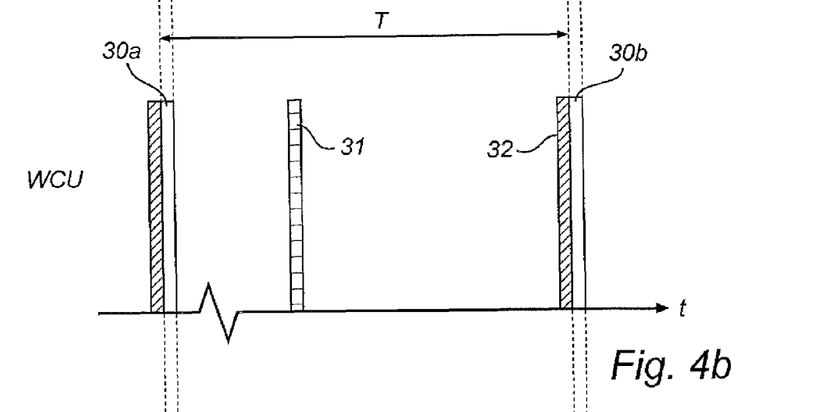
Figure 4C:
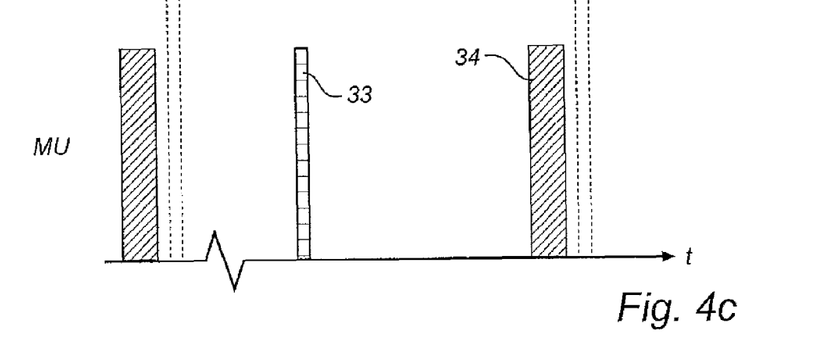

With reference to FIGS. 4*a-c*, an exemplary timing of the active and inactive periods of the MU 10 and the WCU 11 will now be described in relation to the time-slots for wireless communication using, for example, time domain multiple access (TDMA) type wireless communication.

FIG. 4*a* schematically shows communication time slots 30*a-b*, each having a time slot duration $t_{ts}$, and an interval time T between consecutive time slots that is substantially longer than the time slot duration $t_{ts}$. For example, the time slot duration $t_{ts}$ may be in the order of milliseconds, while the interval time may, depending on the application, be in the order of tens of seconds to minutes of even hours for some applications, such as storage tanks for water.

During each time slot 30*a-b*, the WCU 11 communicates with the remote device to, for example, provide a value indicative of the filling level in the tank 2. FIG. 4*b* schematically shows the activities of the WCU in relation to each time slot 30*a-b*. As can be seen in FIG. 4*b*, the WCU is active during a first time period 31 directly after a time slot 30*a* and during a second time period 32 directly before the next time slot 30*b*.

FIG. 4*c* schematically shows the activity periods of the MU 10. As can be seen in FIG. 4*c*, the MU 10 is inactive during the time slots 30*a-b* for wireless communication, and is active during a first time period 33 at some timex after a time slot 30*a* and during a second time period 34 before the next time slot 30*b*.

Referring to FIGS. 4*a-c* and to the description above related to the flow charts in FIG. 3, the WCU 11 activates the MU 10 and sends the measurement request signal $S_{MRQ}$ during the first active time period 31 of the WCU. Thereafter, the WCU 11 puts itself to sleep. As can be seen in FIG. 4*b* and FIG. 4*c*, the MU 10 is thus active at the same time to receive the measurement request signal $S_{MFQ}$, extract the measurement timing and set its internal timer. Thereafter, the MU 10 goes to sleep until it is time to start the filling level measurement.

As can be seen in FIG. 4*c*, the filling level measurement takes place during the second active time period 34, which is finished some time before the next time slot 30*b* for wireless communication. The WCU 11 retrieves the measurement data during its second active time period 32, puts the MU 10 back to sleep and is ready to wirelessly transmit a value indicative of the filling level during the next time slot 30*b* for wireless communication.

The person skilled in the art realizes that the present invention by no means is limited to the preferred embodiments described above. On the contrary, many modifications and variations are possible within the scope of the appended claims, for example the measurement time period need not be encoded in the measurement request signal but the wireless communication unit may provide the activation signal and the measurement request signal to the measurement unit when the measurement should be carried out, such as in the latter half of the interval time between consecutive time slots for wireless communication.

What is claimed is:

1. A method of providing a value indicative of a filling level of a product contained in a tank to a remote device using a battery-powered level gauge system comprising a measurement unit and a wireless communication unit, each being controllable between an active state and an inactive state with a lower power consumption than said active state, the method comprising the steps of:

providing an activation signal from said wireless communication unit to said measurement unit to switch said measurement unit from its inactive state to its active state;

providing a measurement request signal from said wireless communication unit to said measurement unit to request measurement of said filling level;

switching said wireless communication unit from its active state to its inactive state after having provided said measurement request signal to said measurement unit;

measuring said filling level by said measurement unit;

providing, after having measured said filling level, a measurement ready signal from said measurement unit to said wireless communication unit;

switching said wireless communication unit from its inactive state to its active state in response to said measurement ready signal received from said measurement unit at said wireless communication unit;

retrieving said value indicative of said filling level from said measurement unit to said wireless communication unit; and wirelessly transmitting said value indicative of said filling level to said remote device.

2. The method according to claim 1, wherein said step of wirelessly transmitting said value indicative of said filling level to said remote device takes place during a time slot for wireless communication, consecutive time slots for wireless communication being separated by an interval time, and wherein said wireless communication unit controls said measurement unit to measure said filling level during a measurement time period being in a latter half of said interval time.

3. The method according to claim 2, wherein said measurement time period is in a final tenth of said interval time.

4. The method according to claim 2, wherein said wireless communication unit provides said activation signal and said measurement request signal to said measurement unit during said latter half of said interval time.

5. The method according to claim 2, wherein a timing of said measurement time period is encoded by said measurement request signal.

6. The method according to claim 1, further comprising the step of:

providing a deactivation signal from said wireless communication unit to said measurement unit after having retrieved said value indicative of said filling level, to switch said measurement unit from its active state to its inactive state.

7. The method according to claim 1, wherein said method, after the step of providing said measurement request signal from said wireless communication unit to said measurement unit, further comprises the step of:

controlling a timer to switch said wireless communication unit from its inactive state to its active state after a predefined time-out period being longer than an expected time period until receiving said measurement ready signal from said measurement unit.

8. The method according to claim 1, wherein said filling level is measured by transmitting an electromagnetic transmit signal towards a surface of said product contained in the tank, receiving an electromagnetic reflection signal resulting from reflection of said electromagnetic transmit signal at said surface, and determining said filling level based on said electromagnetic reflection signal.

9. A battery-powered level gauge system for providing a value indicative of a filling level of a product contained in a tank to a remote device using wireless communication, said battery-powered level gauge system comprising:

a measurement unit configured to measure said filling level, said measurement unit being controllable between an active state and an inactive state with a lower power consumption than said active state;

a wireless communication unit connected to said measurement unit for retrieving said value indicative of said filling level from said measurement unit and wirelessly transmitting said value indicative of said filling level to said remote device, said wireless communication unit being controllable between an active state and an inactive state with a lower power consumption than said active state; and a local energy store connected to said measurement unit and said wireless communication unit for supplying energy sufficient for operation of said measurement unit and said wireless communication unit, wherein said measurement unit is configured to:
measure said filling level in response to a measurement request signal from said wireless communication unit; and
provide, after having measured said filling level, a measurement ready signal to said wireless communication unit; and wherein said wireless communication unit is configured to:
provide an activation signal to said measurement unit to switch said measurement unit from its inactive state to its active state;
provide a measurement request signal to said measurement unit to request measurement of said filling level;
switch said wireless communication unit from its active state to its inactive state after having provided said measurement request signal to said measurement unit;
switch said wireless communication unit from its inactive state to its active state in response to a measurement ready signal received from said measurement unit;
retrieve said value indicative of said filling level from said measurement unit; and
wirelessly transmit said value indicative of said filling level to said remote device.

10. The battery-powered level gauge system according to claim 9, wherein:

said measurement unit comprises a first output for providing said measurement ready signal, and a second output, separate from said first output, for providing said value indicative of said filling level to said wireless communication unit; and said wireless communication unit comprises a first input connected to said first output of the measurement unit for receiving said measurement ready signal, and a second input, separate from said first input, connected to said second output of the measurement unit for receiving said value indicative of said filling level.

11. The battery-powered level gauge system according to claim 9, wherein said wireless communication unit is further configured to provide a deactivation signal to said measurement unit after having retrieved said value indicative of said filling level, to switch said measurement unit from its active state to its inactive state.

12. The battery-powered level gauge system according to claim 9, wherein:

said wireless communication unit further comprises a timer; and said wireless communication unit is further configured to control said timer to switch said wireless communication unit from its inactive state to its active state after a predefined time-out period being longer than an expected time period until receiving said measurement ready signal from said measurement unit.

13. The battery-powered level gauge system according to claim 9,
wherein said wireless communication unit is configured to wirelessly transmit said value indicative of said filling level to said remote device during a time slot for wireless communication, consecutive time slots for wireless communication being separated by an interval time, and
wherein said wireless communication unit configured to control said measurement unit to measure said filling level during a measurement time period being in a latter half of said interval time.

14. The battery-powered level gauge system according to claim 9, wherein said wireless communication unit is configured to wirelessly transmit said value indicative of said filling level to said remote device only during fixed time slots.

15. The battery-powered level gauge system according to claim 9, wherein said measurement unit comprises:
a transceiver for generating, transmitting and receiving electromagnetic signals;
a propagation device connected to said transceiver for propagating an electromagnetic transmit signal from said transceiver towards a surface of said product contained in said tank and to return to said transceiver an electromagnetic return signal resulting from reflection at said surface of said electromagnetic transmit signal; and
processing circuitry for determining said filling level based on said electromagnetic return signal.

* * * * *